United States Patent

Massa

[11] Patent Number: 5,826,341
[45] Date of Patent: Oct. 27, 1998

[54] TREE TRIMMER

[76] Inventor: Robert E. Massa, 312 E. 48th St., Tulsa, Okla. 74105-4514

[21] Appl. No.: 890,012

[22] Filed: Jul. 10, 1997

[51] Int. Cl.$^6$ .................................................... B26B 15/00
[52] U.S. Cl. ............................... 30/247; 30/249; 30/296.1
[58] Field of Search ............................. 38/247, 249, 245, 38/228, 296.1

[56] References Cited

U.S. PATENT DOCUMENTS

| | | | |
|---|---|---|---|
| 1,762,392 | 6/1930 | Gray | 30/247 |
| 2,504,405 | 4/1950 | Fletcher | 30/249 |
| 2,600,540 | 6/1952 | Johnson | 30/249 |
| 2,714,250 | 8/1955 | Twedt | 30/249 |
| 2,731,721 | 1/1956 | Traurig | 30/247 |
| 3,178,816 | 4/1965 | Schmid | 30/247 |
| 3,657,813 | 4/1972 | Knight | 30/296.1 |
| 4,574,481 | 3/1986 | Ericsson | 30/296.1 |
| 4,696,108 | 9/1987 | Zerrer et al. | 30/296.1 |
| 4,760,646 | 8/1988 | Siegler | 30/382 |
| 4,924,573 | 5/1990 | Huddleston et al. | 30/296.1 |
| 4,976,031 | 12/1990 | Miller | 30/296.1 |
| 5,367,773 | 11/1994 | Robbins | 30/228 |

*Primary Examiner*—Hwei-Siu Payer
*Attorney, Agent, or Firm*—Robert E. Massa

[57] ABSTRACT

A portable tree trimming device comprising a pruning mechanism secured at a distal end of a telescopically extendible housing. The pruning mechanism includes cutting members exterior of the housing drivable by a motor within the housing. The motor receives current furnished thru a coiled cable within the housing receiving power from either a domestic electric source or from a battery unit positioned within the housing. The coiled cable extends and protracts in unison with extension and protraction of the extendible housing.

10 Claims, 3 Drawing Sheets

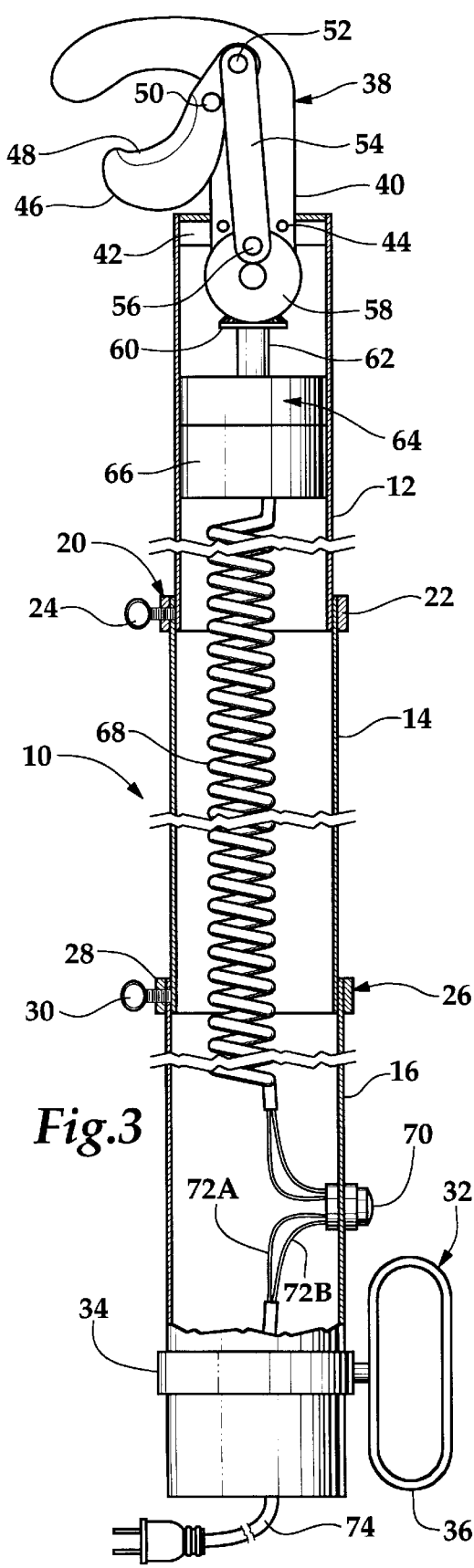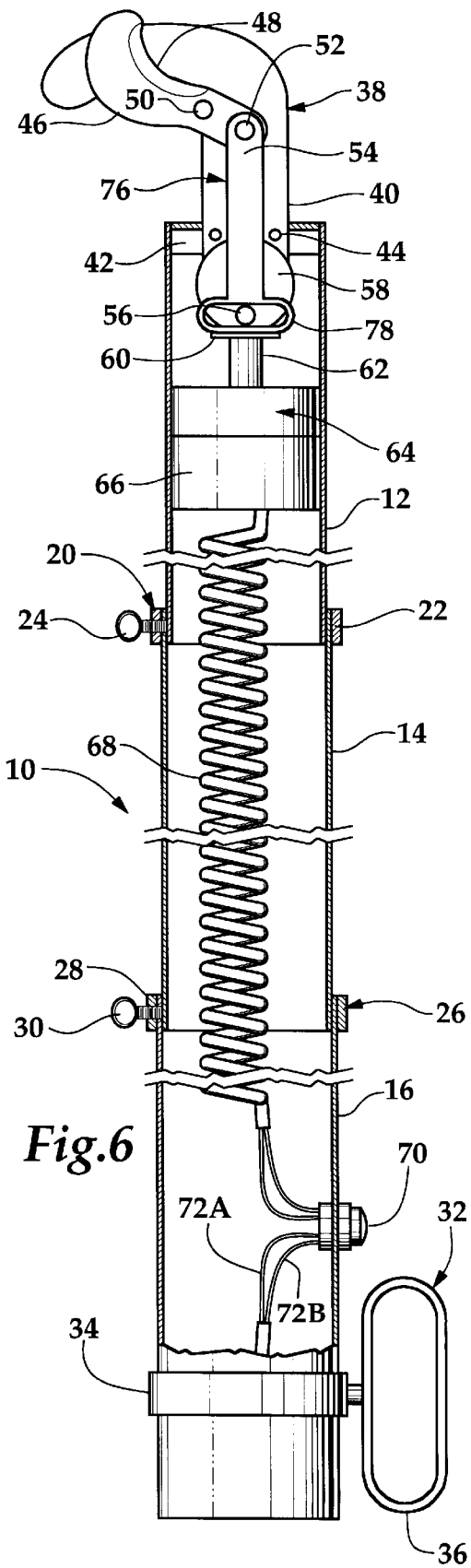

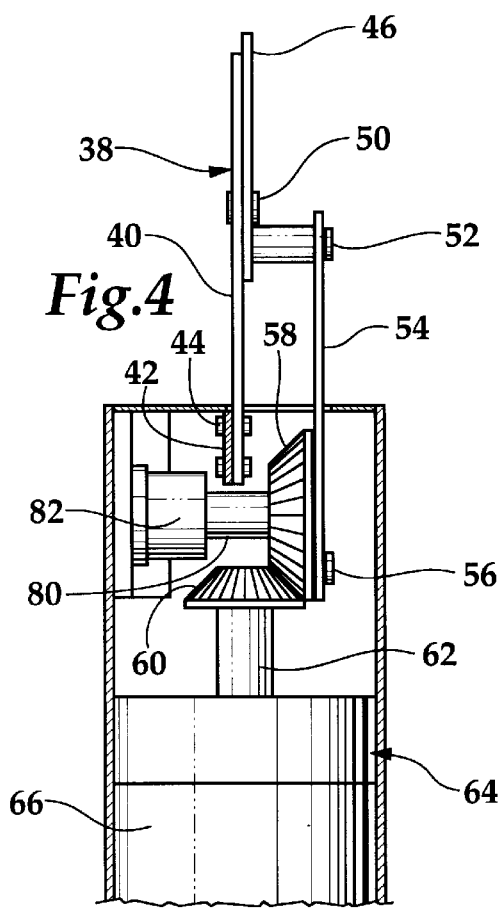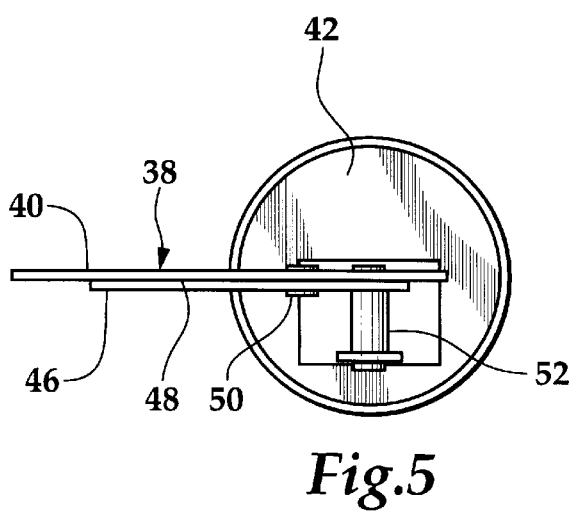

TREE TRIMMER

FIELD OF THE INVENTION

My invention relates to tree trimming devices. More particularly, my invention relates to electrically powered tree trimming devices. More particularly, my invention relates to portable, electrically powered tree trimming devices which may be telescopically extendible to reach tree limbs or branches at different heights. Still more particularly, my invention relates to tree trimming devices having a cutting component on a distal end of an extendible base member with the cutting component actuable by power transmitted through a coiled cable within the base member.

BACKGROUND OF THE INVENTION

Many tree trimming devices have been designed for pruning small branches from trees. Generally, tree trimming devices have been composed of cutting devices positioned atop extendible rods or poles in order to reach considerable distances through a small tree. The various tree trimming devices have been either manually operable or power-driven. For power-driven tree trimming devices, the source of the power has been either hydraulic, gasoline, or electric.

The type of cutting mechanism for cutting small branches may be either some form of shear apparatus or saw type device, which may even be a saw blade or chain saw member.

I have owned and used a particular type of manually-operated tree trimming device for many years, and consequently have become aware of certain disadvantages which I felt could be improved.

The tree trimming device which I have used comprises an extendible tubular member having a lever operable cutting component at the distal end. The lever device extends radially from the tubular member. A long cord is attached to the leverable end of the cutting component, and the cord is longer than the tubular member to be grasped by the operator for activation. Then, a strong pull on the cord operates the cutting component.

I have encountered several distinct disadvantages in the use of my manually-operable tree trimming device. For example:

a. The manual trimmer requires a long, manipulating cord which extends loosely from the cutting component at the upper, distal end of the long tubular support member to the lower end of the tubular support member held by the operator. The lever operating the cutting component extends a considerable distance radially from the support member, and consequently the cord is held at a distance radially from the axis of the support member from the top of the support member to the lower end of the support member. Consequently, the cord very easily becomes entangled with many small tree branches as I try to maneuver the tree trimmer into suitable position among the many tree branches.

b. The long, loose cord which operates the operating lever component requires the operator to grasp the cord firmly and pull with considerable force to sever the particular tree branch currently positioned within the cutting member. I estimate that each cutting action requires an arm movement of at least 2.5 to 3.0 feet to operate the cutting component because of the leverage built into the manual action of the device. Even though the operating component is constructed with considerable leverage, a strong pull is required and the operator's arm may soon become quite tired, and possibly even unduly injured if not handled with care.

c. The manual trimmer, with all the components operating exteriorly of the device, requires a great deal of attention applied to the maneuvering and positioning of the cutting components, levers, and manipulating cord. I found that the attention given to the operating components detracts from important attention which should be given to the careful positioning of the operating component when there are power lines passing through or adjacent the tree which is being trimmed.

Thus, in considering the possible manner in which a tree trimming device might be improved, I eventually developed the invention which I describe herein.

In accordance with the usual practice, I have conducted a patent search which revealed the following patents which were considered to be the closest to my invention:

| | | |
|---|---|---|
| U.S. Pat. No. 1,762,392 | Gray | June 10, 1930 |
| U.S. Pat. No. 2,714,250 | Twedt | Aug. 2, 1955 |
| U.S. Pat. No. 2,731,721 | Traurig | Jan. 24, 1956 |
| U.S. Pat. No. 3,178,816 | Schmid | April 20, 1965 |
| U.S. Pat. No. 4,760,646 | Siegler | Aug. 2, 1988 |
| U.S. Pat. No. 5,367,773 | Robbins | Nov. 29, 1994 |

U.S. Pat. No. 1,762,392 to Gray describes a portable, hand-held, motor-operated shearing device. It is intended to provide a shear which may be used for shearing heavy material, such as tin or sheet iron. The device is used to make curved cuts of small radii.

U.S. Pat. No. 2,714,250 to Twedt describes a hydraulic pruning tool comprising an elongated hollow tube containing an upper piston connected to the cutting head and the upper piston connected to a lower piston to which is attached an actuating lever which operates a self-contained, manually-operated pump.

U.S. Pat. No. 2,731,721 to Traurig describes power operated shears in which the cutting stroke may be adjusted in order to provide either a completely closed cutting stroke or a partly closed stroke. For shearing during continuous action of the shears, it is more efficient to keep the shears from closing completely during each stroke. The housing includes a motor for driving the shears, and the shears comprises a stationary lower blade and a driven upper blade. Thus, the amount of closure of the blades is adjusted by the adjustment of the angle of inclination of the stationary lower blade. The angle of inclination may be adjusted by an adjusting mechanism connected to the stationary blade at a point within the housing and adjustable from outside the housing.

U.S. Pat. No. 3,178,816 to Schmid describes a motor driven pruning shear in which the operation is such that the motor rotation is reversed with each cycle of the shear. A casing includes the motor, a drive screw connected to the motor and to an electric switch device within the casing. The shear includes an upwardly projecting fixed shear blade mounted on the casing, and a movable blade pivotally connected to the fixed blade. The movable blade is attached to the screw mechanism. With each cycle the screw mechanism causes a lug to move into contact with the switch to reverse the action of the motor. Also, a single action of the shearing blade may be achieved by a momentary squeeze of the trigger.

U.S. Pat. No. 4,760,646 to Siegler describes a tree pruner and hedge trimmer operable either by manual power, a gasoline engine, or an electric motor. The basic components for all sources of power are essentially the same. The apparatus includes an elongated telescopic boom having a cutting assembly at the top with the power means at the bottom. The pruner embodiment includes a chain saw in the cutting assembly. The hedge trimmer consists of a cutting blade. The cutting assembly of the chain saw includes means for infinitesimal adjustment of the chain saw, and the chain saw assembly is designed to eliminate kickback of the chain saw. Intermittent rotary motion is given to the chain saw or hedge trimmer disc by means of a pulling force produced by either the power source or manual operation. The manual embodiment provides sufficient force to operate the cutting member only by the provision of a longer manual power stroke and longer rewind spring.

U.S. Pat. No. 5,367,773 to Robbins describes a power driven pruning device comprising an elongated support member having a cutting member at the upper end and an actuating member at the lower end. The cutting member includes a stationary cutting component secured to the end of the support member and a pivotal cutting component attached to the stationary component. The pivotal component includes an elongated portion to provide leverable action to the cutting member. The drive member includes a spool for storage of a cable which connects the drive member to the elongated portion of the pivotal cutting component to transmit suitable force to the cutting component. A tension spring connects the pivotal cutting component to the stationary cutting component to give the device a resilient action.

SUMMARY OF THE INVENTION

The primary object of my invention is to provide a tree trimming device which is simple in construction, efficient in operation, and safe to use.

Another object of my invention is to provide a tree trimming device which is convenient to use, easy to handle in avoiding entanglement with tree branches which it is not intended to cut, and easily maneuverable.

Still another object of my invention is to provide a tree trimmer which is easily adjustable for trimming branches at various heights within the tree.

Still another object of my invention is to provide a tree trimmer which is adaptable for trimming tree branches which are at considerable distances from the ground.

Still another object of my invention is to provide a tree trimmer which is electrically operable in a smooth and safe manner.

Still another object of my invention is to provide a tree trimmer which includes an electrical power component which operates the trimming device in a safe and convenient manner.

Still another object of my invention is to provide a tree trimmer which is portable and is therewith efficiently and safely operable.

Although it would be theoretically possible to construct tree trimming devices capable of cutting large diameter branches, it would not be considered practical or safe for an inexperienced gardener to employ extremely heavy duty tree trimming devices.

For instance, large diameter branches, such as 2 to 3 inch diameter branches, would inevitably comprise a great deal of wood and be extremely heavy and would require heavy equipment and would be dangerous activity. It would be very dangerous for the average household gardener to try to trim branches of great weight. These should be reserved for the professional tree pruner.

I have considered safety to the operator as of primary importance with the design of my tree trimming device.

Therefore, I have purposely designed and built a lightweight, portable tree trimming apparatus to be easily maneuverable by the average home gardener.

I have particularly eliminated the commonly-used, exteriorly-positioned operating ropes, wires or cables, and awkward operating components in order that the operator may devote his entire attention to the guidance of the operating head of his tree trimmer and not have his attention constantly diverted to extensive exterior components of his trimmer.

The coiled electric line of my tree trimmer is of a length sufficient to extend beyond the length of the trimmer shaft when the telescopically extendible shaft is extended to the fullest length. With the coiled wire there will be no twisting or curling within the tubular shaft members as the shaft is extended to its full length or shortened to its shortest length for storage, as there would be in the use of a non-coiled wire.

A further arrangement to prevent any entanglement of the transmission wire, or to prevent excessive wear of the wire, is to configure the tubular components of the shaft in a manner, preferably, that a tube member of smaller diameter is successively positioned toward the distal end of the trimmer. Thus, the ultimate tube member upon which the operating components placed is of the smallest diameter, and as a result there will be much less opportunity for excessive wear of the wire member as the tubular components are retracted for storage or adjustment.

The electric switch provided may be either a momentary switch or continuous action. For thin, soft branches, a single action of the cutting blade should be preferable, and for thicker, tougher branches, a continual action of the cutting blade should be preferred, thus allowing the operator to maintain the action until the tougher wood is cut.

I have designed my tree trimming apparatus with all possible consideration for safety regarding electrical reactions. Any time a long pole is maneuvered through the branches of a tree, there is a chance for unwitting contact with an electric line. In addition, without careful observation, a tree trimmer might even contact branches which appear to be safely removed from power lines, but actually are in contact with some power lines which become exposed through removal of insulation. In such instances, older power lines might have open, uninsulated areas which might be occasionally in contact with some branches, especially after a rain, when both lines and branches are still wet. Thus, the tubular components should preferably be of non-conducting plastic material, certainly not of metal.

My tree trimming device may be operable either by means of connection to a typical domestic electrical power source, or by inclusion of a battery component. Attachment to a domestic power source may be readily accomplished by the conventional extension cord. A battery-powered tree trimming device may be powered by inclusion of a conventional re-chargeable battery.

In my tree trimming device I have made the lower cutting blade of the cutting component movable and operable leverably by the actuating assembly in order to provide the greatest amount of force for the cutting operation.

The coiled configuration of the electric wire will assure, that upon extension or contraction of the tubular members, there will not be undue rubbing of any of the coiled wire against an inner rim of a tubular member; the careful choice of proper coiled wire members will avoid this action. An electric cord which is not properly coiled will not provide for easy extension or protraction of the cord eventual damage or entanglement of the cord.

I shall subsequently describe in detail other major features of my tree trimming device.

Then, the above objects and advantages of my invention will become apparent from my description of the following preferred embodiments of my invention.

BRIEF DESCRIPTION OF THE DRAWINGS

FIG. 3 is an exploded side view, partly in section, of the embodiment of tree trimmer device shown in FIG. 2, illustrating a device as it would appear in an extended position.

FIG. 4 is a sectional view of operating components of a tree trimming device according to my invention.

FIG. 5 is a top view of a tree trimming device according to my invention.

FIG. 6 is an exploded side view, partly in section, of an alternate embodiment of a tree trimmer device according to my invention, describing a battery-operated embodiment in a substantially extended condition.

DESCRIPTION OF THE PREFERRED EMBODIMENTS

Figure 1:
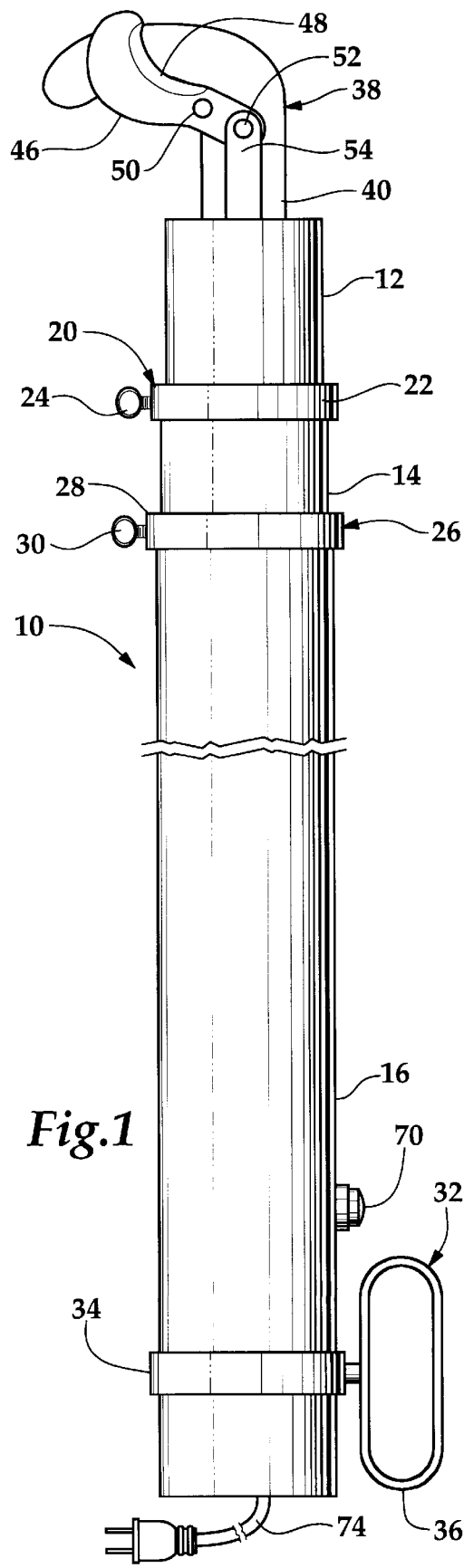
FIG. 1 is an exploded side view of a tree trimmer device according to my invention showing the tree trimmer as it would be in a retracted condition.

In FIG. 1, I describe one embodiment of a tree trimmer device 10, generally, according to my invention. In the elevational view of FIG. 1, I describe the tree trimmer 10 as having housing members 12, 14, and 16 fitted together in a retracted condition, as it would be considered in its most convenient position for ease of handling or easy storage.

The tree trimmer device 10 includes a cutting component 38, generally, positioned securely upon an upper, or distal, end of the trimmer, thus positioned upon housing member 12.

FIG. 1 also shows one manner in which the housing members 12, 14, and 16 are held in position by clamping members. A first clamping member 20, generally, includes a securing band 22 around housing member 14 and held in suitable adjustment and security by means of a thumb screw 24.

Housing member 14 may be suitably positioned within housing member 16, and held securely therein, by means of a second clamping member, 26, generally, which includes a securing band 28 around housing member 16 and held in position by a thumb screw 30. For storage, or easy transportation, the tree trimmer may be easily handled by loosening of thumb screws 24 and 30 and retraction of housing members 12 and 14 into housing member 16. Then, for operation, the housing members may be suitably adjusted and secured into position as preferred by the operator.

A handle member 32, generally, comprises a securing band 34 securable into comfortable position by adjustment of a screw-type handle member 36, adjustable by the operator.

As I have described above, and now show specifically, in FIGS. 1 and 2, I have designed a tree trimmer which is safe, convenient, and easy to use, because I have eliminated undue interference which is commonly noted in extendible tree trimming devices, which is particularly encountered because of components of such devices which extend substantially radially from a tubular component. The method of handling is made easier because more attention may be given to the maneuvering of the tree trimming device and less attention need be given to loose exterior components.

My tree trimmer device 10 includes a pruning component 38, generally, positioned at the distal end of the trimmer, and which includes a stationary cutting member 40 attached to a support member 42 by any suitable means of attachment, such as a screw 44.

The pruning component 38 includes a movable cutting member 46 which has a sharp cutting surface 48. Cutting member 46 is movably secured to the stationary cutting member 40 by means of a pin 50. Then, for cutting operation, movable cutting member 46 is operatively connected by means of a pin 52 to a flat bar member 54, which, in turn, is connected by pin 56 to a gear component 58, which is operatively positionable against driving gear 60. Driving gear 60 is positioned on shaft 62 connected to a conventional clutch component 64, generally, of a type of clutch conventionally used for power equipment to permit safe and protective operation. The clutch component 64 provides the means for quickly and safely disconnecting the cutting components from typical electric motor 66 should there be a sudden interference of the cutting action by any sudden overload of the motor, as when the cutting member encounters a branch which might be too difficult to cut, or if the tree trimmer should encounter some other impenetrable object.

Motor 66 is of a type commonly adaptable for use in the usual domestic type appliance or equipment, readily operable through the use of a safe extension cord.

Figure 2:
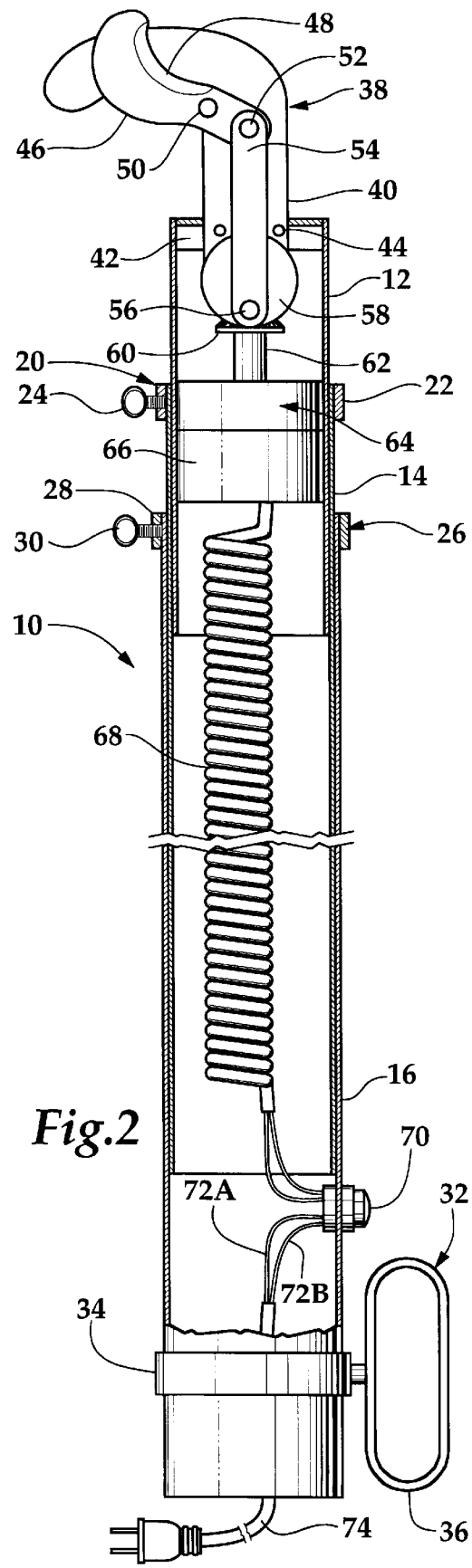
FIG. 2 is an exploded side view, partly in section, of one embodiment of a tree trimmer device according to my invention illustrating interior positioning of operating components as the device would appear in a retracted position.

A most important feature of the tree trimmer device 10 is the use of a coiled cable wire 68, shown in FIG. 2 in a retracted condition, when the housing members 12, 14, and 16 are in a retracted condition; and shown in FIGS. 3 and 6 in an extended condition when the housing member 12, 14, and 16 are in an extended condition.

At its upper end, wires of the cable 68 are attached to motor 66, and at its lower end, wires of cable 68 are attached to a switch member 70.

The tree trimmer devices described in FIGS. 1, 2, and 3 show the switch member 70 connected by lines 72A and 72B to extension cord 74. In FIG. 6, lines 72A and 72B connect switch member 70 to a battery component (not shown) within the lower end of lower housing member 16.

FIG. 6 describes a slightly modified power transfer component for the cutting mechanism. The means for transferring power from the gear component 58 to the movable cutting member 46 comprises a flat bar member 76, generally, which includes a slotted end member 78 enclosing pin 56 attached to gear 58, thus displaying another well-known form of power transmission.

As I show in FIG. 4, the gear mechanism 58 is secured upon a shaft component 80 which is held rotatably and supportably within a bushing component 82 secured against the inner wall of upper housing member 12.

Since many different embodiments of my invention may be made without departing from the spirit and scope thereof, it is to be understood that the specific embodiments described in detail herein are not to be taken in a limiting sense, since the scope of the invention is best defined by the appended claims.

I claim:

1. A tree trimmer, comprising:

an elongated tubular housing, a pruning mechanism mounted on a first end of the tubular housing, including
a first cutting member fixedly secured on the tubular housing, and
a second cutting member pivotally secured on the first cutting member and in cutting cooperation with the first cutting member,
an operating component positioned within the tubular housing adjacent to and connected to the pruning mechanism, the operating component including
a motor, and
a clutch,
a driving component positioned within the tubular housing connecting the operating component to the pruning mechanism, and
a power cable component positioned within the tubular housing connecting the motor to a source of power with said power cable component further connected circuitably to a power switch positioned near a second end of the tubular housing.

2. A tree trimmer as described in claim 1, wherein
said tubular housing includes two telescopically extendible tubular members forming said tubular housing, and
said power cable component comprises a coiled cable member,
whereby the coiled cable is adaptable to extend in uncoilable length as the tubular housing is extended, and contract in coilable length as the tubular housing is contracted, yet will remain within the tubular housing.

3. A tree trimmer as described in claim 2 wherein
the driving component includes
a gear mechanism, and
a connecting member connecting the gear mechanism to the second cutting member.

4. A tree trimmer as described in claim 3, wherein substantially all of said components are positioned within the tubular housing.

5. A tree trimmer as described in claim 4, wherein
the first cutting member has an arcuate cutting edge to provide more secure cutting positioning, and
the second cutting member has an arcuate cutting edge.

6. A tree trimmer as described in claim 5, wherein
said tubular members comprise an upper tubular member and an adjacent lower tubular member, said upper tubular member having an interior diameter smaller than that of said adjacent lower tubular member.

7. A tree trimmer as described in claim 6, wherein
the source of power comprises a domestic power source.

8. A tree trimmer as described in claim 7, wherein
the tubular housing is made of non-metallic material.

9. A tree trimmer as described in claim 6, wherein
the source of power comprises a portable battery component.

10. A tree trimmer as described in claim 9, wherein
the tubular housing is made of non-metallic material.

* * * * *